UNITED STATES PATENT OFFICE.

CARL PONTOPPIDAN, OF BROOKLYN, NEW YORK, ASSIGNOR TO F. L. SMIDTH & CO., OF NEW YORK, N. Y., A CORPORATION OF NEW JERSEY.

MANUFACTURE OF PORTLAND CEMENT.

1,320,172.   Specification of Letters Patent.   Patented Oct. 28, 1919.

No Drawing. Application filed October 11, 1917, Serial No. 195,947. Renewed March 6, 1919. Serial No. 281,080.

*To all whom it may concern:*

Be it known that I, CARL PONTOPPIDAN, a subject of the King of Denmark, residing in the borough of Brooklyn of the city of New York, county of Kings, in the State of New York, have invented certain new and useful Improvements in Manufacture of Portland Cement, of which the following is a specification.

This invention relates particularly to the manufacture of Portland cement by the wet process, in which the raw materials are ground together with water to form slurry, which is subsequently calcined in suitable kilns. This process is now generally preferred to the dry process, in which the raw materials are ground separately, but cannot be employed advantageously when the raw materials or any of them possess hydraulic properties. It is found that the slurry made with such raw materials often sets to such an extent as to prevent its being handled properly in the apparatus employed. It is the object of this invention to make it possible to employ the wet process with raw materials which possess hydraulic properties without in any way reducing the hydraulic properties of the finished cement. To this end a preventive of setting is incorporated with the slurry during its formation or with the raw materials thereof and its active effect in preventing the proper setting of the finished cement is destroyed by heat in the subsequent calcining of the slurry. It is not necessary that the preventive of setting shall be an absolute preventive, but that it shall be a preventive of the normal setting of the cement at least to the extent of delaying the setting action. It is necessary, however, that the preventive employed shall be such that its active effect can be completely negatived in the subsequent treatment of the slurry, as by burning, so that the normal setting of the finished cement shall not be impaired.

Sugar in some form is found to be a preventive, which is easily obtainable, economical in the small quantity required, capable of retarding the setting of the hydraulic raw materials sufficiently to permit the slurry to be handled freely, and also capable of having its preventive or retardant effect destroyed by the usual treatment of the slurry by heat.

In the practice of the invention the raw materials, such as blast furnace slag and limestone, are ground together in water, as usual in the practice of the wet process of making Portland cement, except that a small quantity of sugar, usually about one-quarter of one per cent. by weight of the raw materials, is added to the raw materials or to the mixture thereof before the setting commences. Thereafter the effect of the preventive of setting is negatived. If sugar in some form be the preventive employed, this can be accomplished most readily by the action of heat, and this step need not be separated from the usual treatment by heat of slurry in the kiln, the clinker being then ground in the usual manner.

Molasses and other substances, such, for example, as oxy-acids, oxy-aldehydes and oxyketones, which have the effect of preventing or retarding the setting action of cement, and are capable of having such action negatived after the transfer of the slurry from the mills in which it is prepared, might be substituted for the sugar. The particular preventive to be selected may depend upon the character of the raw materials or upon the cost or upon other conditions.

I claim as my invention:

1. The improvement in the manufacture of Portland cement from raw materials which possess hydraulic properties, which consists in forming a slurry of raw materials and water, preventing the setting action of such raw materials in the slurry, and subsequently negativing the action of the preventive and completing the manufacture of the cement.

2. The improvement in the manufacture of Portland cement from raw materials which possess hydraulic properties, which consists in forming a slurry of the raw materials and water, preventing the setting action of such raw materials in the slurry, negativing the action of the preventive by heat, and completing the manufacture of the cement.

3. The improvement in the manufacture of Portland cement from raw materials which possess hydraulic properties, which consists in forming a slurry of raw materials and water, preventing the setting action of such raw materials in the slurry and subsequently calcining the slurry.

4. The improvement in the manufacture of Portland cement from raw materials which possess hydraulic properties, which consists in forming a slurry of raw materials, and water, introducing in the slurry a preventive of the setting action of such raw materials, and subsequently negativing the action of the preventive, and completing the manufacture of the cement.

5. The improvement in the manufacture of Portland cement from raw materials which possess hydraulic properties, which consists in forming a slurry of raw materials and water, introducing in the slurry a preventive of the setting action of such raw materials, and subsequently subjecting the slurry to the action of heat to drive off the water, calcine the slurry, and negative the action of the preventive.

6. The improvement in the manufacture of Portland cement from raw materials which possess hydraulic properties, which consists in forming a slurry of raw materials and water, adding sugar to the slurry to prevent the setting action of such raw materials, and subsequently negativing the preventive action of the sugar by heat and completing the manufacture of the cement.

7. The improvement in the manufacture of Portland cement from raw materials which possess hydraulic properties, which consists in forming a slurry of raw materials and water, adding sugar to the slurry to prevent the setting action of such raw materials, and subsequently treating the slurry in a calcining kiln.

This specification signed this 9th day of October, A. D. 1917.

CARL PONTOPPIDAN.